United States Patent
Brown et al.

(10) Patent No.: US 8,239,934 B2
(45) Date of Patent: *Aug. 7, 2012

(54) VIRTUAL PRIVATE NETWORK FOR REAL-TIME DATA

(75) Inventors: Michael K. Brown, Kitchener (CA); Thomas C. Nagy, Waterloo (CA); Ian M. Robertson, Waterloo (CA)

(73) Assignee: Research In Motion Limited, Waterloo (CA)

( * ) Notice: Subject to any disclaimer, the term of this patent is extended or adjusted under 35 U.S.C. 154(b) by 321 days.

This patent is subject to a terminal disclaimer.

(21) Appl. No.: 12/470,807

(22) Filed: May 22, 2009

(65) Prior Publication Data

US 2009/0235351 A1  Sep. 17, 2009

Related U.S. Application Data

(63) Continuation of application No. 11/147,195, filed on Jun. 8, 2005, now Pat. No. 7,565,689.

(51) Int. Cl.
*G06F 9/00* (2006.01)
(52) U.S. Cl. .......................................... 726/15; 380/270
(58) Field of Classification Search ........................ 726/15; 713/171, 160; 380/28, 270
See application file for complete search history.

(56) References Cited

U.S. PATENT DOCUMENTS

| | | | |
|---|---|---|---|
| 6,614,800 B1* | 9/2003 | Genty et al. | 370/464 |
| 6,687,245 B2* | 2/2004 | Fangman et al. | 370/356 |
| 6,816,462 B1* | 11/2004 | Booth et al. | 370/248 |
| 6,870,929 B1* | 3/2005 | Greene | 380/28 |
| 7,046,647 B2 | 5/2006 | Oba et al. | |
| 7,366,894 B1* | 4/2008 | Kalimuthu et al. | 713/153 |
| 7,633,909 B1* | 12/2009 | Jones et al. | 370/338 |
| 2003/0053434 A1 | 3/2003 | Chow et al. | |
| 2003/0058827 A1 | 3/2003 | Chow et al. | |
| 2003/0149869 A1* | 8/2003 | Gleichauf | 713/153 |
| 2004/0054820 A1 | 3/2004 | Karaoguz et al. | |
| 2004/0081140 A1 | 4/2004 | Martin | |
| 2004/0236547 A1 | 11/2004 | Rappaport et al. | |
| 2004/0255121 A1 | 12/2004 | Eckert et al. | |
| 2004/0260747 A1 | 12/2004 | Ying et al. | |
| 2006/0282889 A1 | 12/2006 | Brown et al. | |

FOREIGN PATENT DOCUMENTS

EP   1328086 A   7/2003

OTHER PUBLICATIONS

European Search Report for EP Patent Application No. EP05105031.

* cited by examiner

*Primary Examiner* — Samson Lemma
(74) *Attorney, Agent, or Firm* — Ridout & Maybee LLP

(57) ABSTRACT

Protection of real-time data such as voice data exchanged as packets between a mobile electronic device and a VPN gateway during a media session over a communications link that includes a wireless network. A first VPN connection is established between the mobile electronic device and the VPN gateway through the communications link, the first VPN connection using key-based encryption to protect data exchanged therethrough. While the first VPN connection is established, a second VPN connection is established between the mobile electronic device and the VPN gateway through the communications link, the second VPN connection using key-based encryption to protect data exchanged therethrough. Real-time data packets are exchanged between the mobile electronic device and the VPN gateway through the second VPN connection.

14 Claims, 3 Drawing Sheets

VIRTUAL PRIVATE NETWORK FOR REAL-TIME DATA

RELATED APPLICATION DATA

The present application is a continuation of non-provisional U.S. patent application Ser. No. 11/147,195, filed Jun. 8, 2005, the entire contents of which are incorporated herein by reference.

TECHNICAL FIELD

The present disclosure relates to virtual private networks for protecting real-time media data such as voice data, including data transmitted from and to mobile electronic devices.

BACKGROUND

There is a growing interest in packet based voice telephone, such as voice over Internet protocol (VOIP) telephone, as an alternative to traditional public switched telephone networks (PSTNs). Enterprises such as corporations and other organizations are adopting VoIP as an alternative to traditional telephone systems. In some environments, VoIP is applied to mobile phones. As a security measure, enterprises typically use a virtual private network (VPN) for communications between devices within the enterprise network and external devices, such that all data exchanged with an external device is encrypted. However, the algorithms traditionally applied to non-time sensitive data communications may cause degradation or excessive delays when applied to time-sensitive media data such as voice data, especially when such algorithms are applied by a resource-limited mobile phone device. Additionally, the use of resource intensive encryption/decryption algorithms for real-time media data on a mobile device can in some cases effectively cause other applications on the device to slow down.

Accordingly, a system and method for securing wireless media data such as voice data in a resource-limited environment is desired.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION

Embodiments are described in the present disclosure for a method and system for establishing two secure VPN connections or tunnels through a communications link between a mobile device and a network. One of the VPN tunnels is used for the exchange of media data such as voice data and the other of the VPN tunnels is used to exchange key data that is used for encrypting and decrypting the media data.

In accordance with one embodiment of the present disclosure, there is provided a method for protecting real-time data exchanged as packets between a mobile electronic device and a VPN gateway during a media session over a communications link that includes a wireless network, the method comprising: establishing a first VPN connection between the mobile electronic device and the VPN gateway through the communications link, the first VPN connection using a first key-based encryption algorithm to protect data exchanged therethrough; establishing, while the first VPN connection is established, a second VPN connection between the mobile electronic device and the VPN gateway through the communications link, the second VPN connection using a second key-based encryption algorithm to protect data exchanged therethrough, the second algorithm being a lower-bit encryption algorithm than the first algorithm; and exchanging real-time data packets between the mobile electronic device and the VPN gateway through the second VPN connection.

In accordance with another embodiment of the present disclosure, there is provided a mobile electronic device for engaging in a media session in which real-time data packets are exchanged with a remote location, the mobile device comprising: a wireless communications subsystem for exchanging data packets with the remote location through a communications link that includes a wireless network; a processor for controlling the communications subsystem; and a VPN module associated with the processor for establishing co-existing first and second VPN connections through the communications link between the mobile electronic device and the remote location and exchanging there-between real-time data through the second VPN connection protected by a less resource-intensive encryption algorithm than the data sent through the first VPN connection.

In accordance with a further embodiment of the present disclosure, there is provided a VPN gateway for exchanging real-time data packets with a remote device over a communications link, the gateway having means for establishing co-existing first and second VPN connections through the communications link between the VPN gateway and the remote device location and exchanging there-between real-time data through the second VPN connection protected by a less resource-intensive encryption algorithm than the data sent through the first VPN connection.

Figure 1:
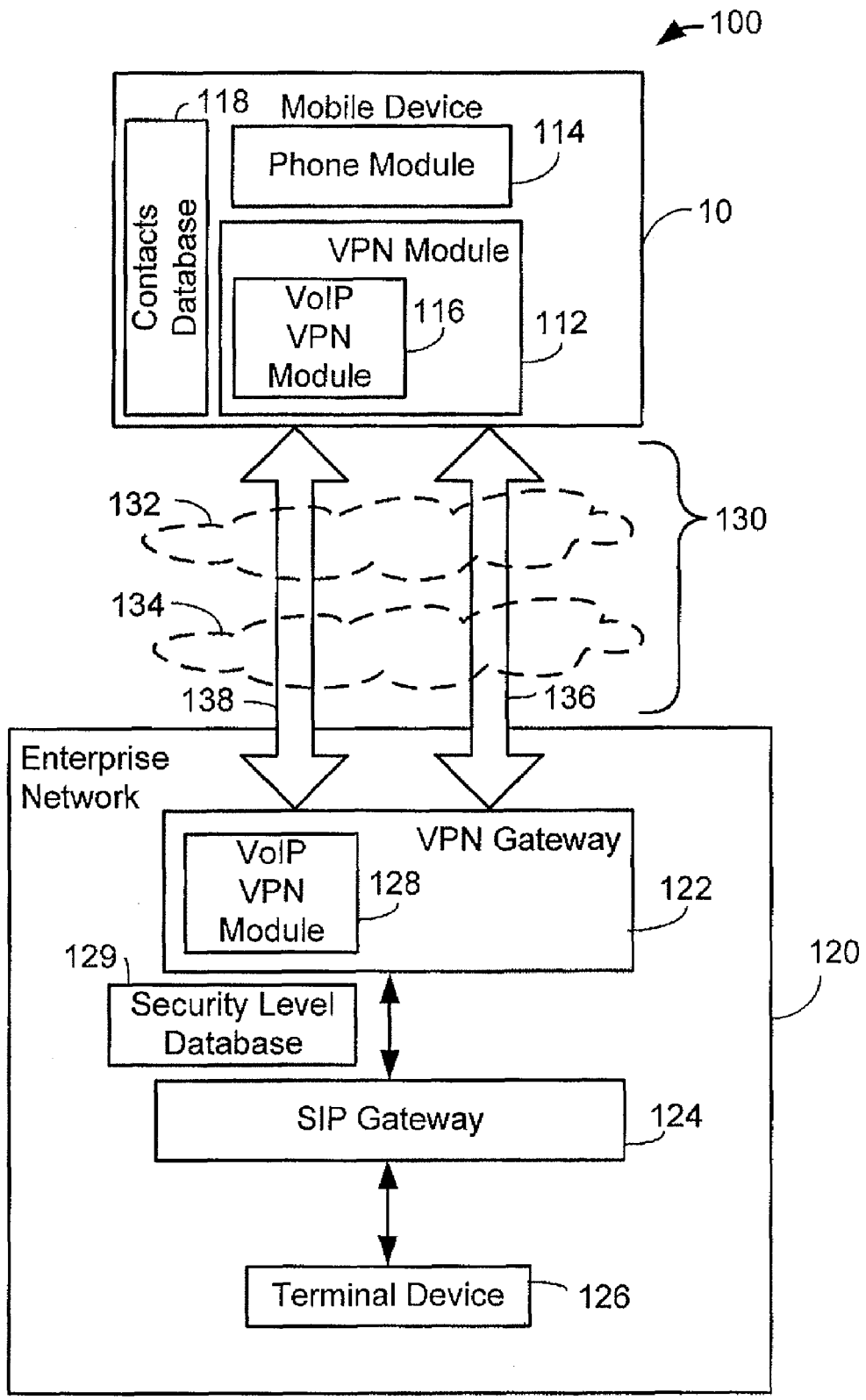
FIG. 1 is a block diagram of a communications system incorporating example embodiments.

Referring first to FIG. 1, there is a block diagram of a communication system 100 according to at least one example embodiment of the present disclosure. The communication system 100 includes a mobile electronic device 10 and an enterprise network 120 which exchange data through a communications link 130. The mobile electronic device 10 and enterprise network 120 are configured to exchange packets of real-time data such as voice data over the communications link 130 during Voice-over-IP (VOIP) calls in which media sessions are established between the mobile device 10 and a terminal device 126. During VoIP media sessions, data packets are exchanged over an IP-based network using real-time transport protocol (RTP) (or other real-time transport protocols) on top of the user datagram protocol (UDP) (or other suitable protocol). Session initiation protocol (SIP) or other suitable control protocols are employed to set-up, manage, control and/or tear down media paths between termination points.

In FIG. 1, the terminal device 126 is shown as part of the enterprise network 120, however the terminal device 126 may be external to the network 120 and may be a further mobile device 10 connected to the network by communications link that is the same as or similar to communications link 130.

Communications link 130 provides a path for VoIP data between mobile device 10 and the enterprise network 120 and includes one or more wireless networks 132. In some example embodiments, the communications link also includes one or more wired network 134 portions, however in some embodiments the wireless network 132 is connected directly to the enterprise network 120. In example embodiments, wireless network 132 includes a wireless local area network (WLAN) which conforms to IEEE 802.11 standards, for example 802.11b and/or 802.11g, or Bluetooth™, however other communications protocols could also be used for the WLAN. In some example embodiments, instead of or in addition to a WLAN, wireless network 132 includes a wireless wide area network (WAN) that is a packet based cellular network. The wireless WAN can be or include any of a number of types of network including by way of non-limiting example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution) or UMTS (Universal Mobile Telecommunications Systems) or EvDO (Evolution Data Only).

The wired network 134 includes, in various example embodiments, the Internet, a further enterprise Internet or network, a direct connection, a public switched telephone network PSTN, and/or other wide area or local area networks across which data packets can travel.

In order to provide for secure communications, the enterprise network 120 includes a virtual private network (VPN) gateway 122 for establishing secure VPN connections or tunnels with external devices such as mobile electronic device 10. The VPN gateway 122 can be implemented on a computer such as a server running suitable VPN software. The enterprise network 120 also includes a session initiation protocol (SIP) gateway 124 for setting-up, managing, controlling and/or tearing down media paths between the mobile electronic device 10 and terminal device 126. The SIP gateway 124 can be implemented on a computer such as a server running suitable SIP software. In some embodiments, SIP gateway 124 is replaced with a gateway using a different control protocol.

Although only a single mobile electronic device 10 is shown in FIG. 1, communications system 100 will typically include several of such devices. As suggested above, terminal device 126 can be a mobile electronic device 10. In one example embodiment, mobile electronic devices 10 are handheld two-way mobile communication devices 10 having VoIP voice communication and data communication capabilities. In an example embodiment, the devices 10 have the capability to communicate with other computer systems on the Internet. In various embodiments, mobile electronic devices 10 may include, by way of non limiting example, multiple-mode communication devices configured for both data and voice communication, mobile telephones, and PDAs enabled for wireless phone communications.

The mobile electronic device 10 includes a VPN module 112 for establishing secure encrypted communications through the communications link 130 with the VPN gateway 122 of enterprise network 120. As will be explained in greater detail below, in example embodiments of the present disclosure, the VPN module 112 and VPN gateway 122 are configured to establish a first or primary secure VPN connection or tunnel 136 and a secondary secure VPN connection or tunnel 138 between the mobile electronic device 10 and the enterprise network 120 through communications link 130. The primary secure VPN connection 136 is used to exchange non-real-time data over communications link 130 and may be set up for long time periods as determined by the VPN gateway 122. The secondary secure VPN connection 138 is used to exchange real-time media data such as voice data over communications link 130, and will generally be set up for a much shorter duration than the primary secure VPN connection 138, for example, for the length of a VoIP call or media session. A less resource intensive encryption algorithm and/or encryption technique is used for the secondary VPN connection 138 than the primary VPN connection 136, thereby allowing time sensitive data to be processed faster than if sent through the primary VPN connection 136. The primary VPN connection 136 is used to exchange shared secrets, for example seeds, used to establish the keys for encrypting and decrypting data that is sent through the secondary VPN connection 138.

Figure 2:
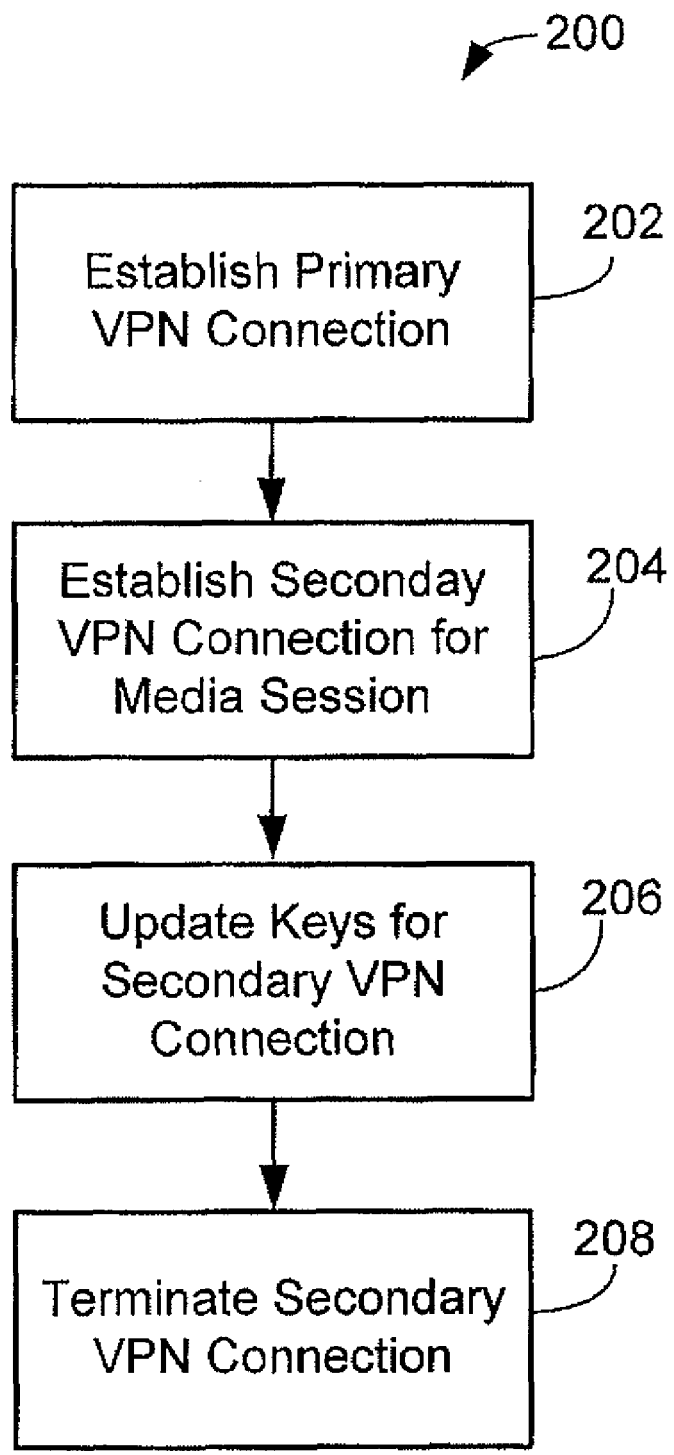
FIG. 2 is a block diagram of a process for establishing secure communications for media data such as voice data in the communications system of FIG. 1.

An overview having been provided, a more detailed explanation will now be provided with reference to FIG. 1 and the block diagram of FIG. 2 which illustrates a process 200 for protecting real-time data packets according to example embodiments of the present disclosure. As indicated in step 202, a first or primary secure VPN connection 136 is established through the communications link 130 between the VPN gateway 122 of network 120 and the mobile device 10. In an example embodiment, the primary secure VPN connection 136 uses a shared secret or keys previously stored on mobile device 10 and VPN gateway 122 for encrypting data sent over the communications link 130. While the communications link 130 is maintained, the primary VPN connection 136 will last for a duration set by the VPN gateway 122 or negotiated between the gateway 122 and the mobile device 10. The primary VPN connection 136 is in example embodiments a conventional VPN connection, and could for example employ triple DES (data encryption standard) or AES (advanced encryption standard). Data that is not particularly time sensitive is exchanged between the VPN gateway 122 and the mobile device 10 over the primary VPN connection 136 through the communications link 130. For example, e-mail messages, text messages, and file downloads and uploads can be exchanged over the primary VPN connection 136.

As indicated above, the mobile device 10 is enabled for packet based voice communications, and in this regard includes a phone module 114 for establishing VoIP media sessions with a terminal device 126 via the communications link 130. SIP gateway 124 manages the setup and teardown of such media sessions. As indicated in step 204, when a media session between the mobile device and the terminal device 126 is set up, a secondary VPN connection 138 is established through the communications link 130 between VPN gateway 122 and mobile device 10 for media data such as voice data that is exchanged during the media session. In example embodiments, the VPN module 112 on device 10 and the VPN gateway 122 each include respective VoIP VPN sub-modules 116, 128 for negotiating and maintaining the secondary VPN connection 138 during the VoIP media session. Sub-modules 116, 128 are, in at least some example embodiments implemented by software instructions executed by micro-processors. In example embodiments, the encryption method used in the secondary VPN connection 138 for protecting the media data is simpler and less resource intensive that that used in the primary VPN connection 136. This reduces the possibility that time-sensitive voice data will be degraded through the encryption and decryption process at the resource limited mobile device 10. For example, in at least some embodiments, the encryption keys used for the secondary VPN connection 138 are smaller than those used for the primary VPN connection 136 such that secondary VPN connection 138 uses a lower-bit encryption than the primary VPN connection 136. Additionally, or alternatively, simpler encryption techniques may be used for the secondary VPN connection 138 than those used for the primary VPN connection 136. By way of non-limiting example, if a triple DES encryption (i.e. encrypt with one key, decrypt with a second key, than encrypt with a third key, then transmit) is used for the primary VPN connection, then single DES-type encryption may be used in the secondary VPN connection 138.

In example embodiments, to compensate for the use of simpler encryption keys and/or techniques in the secondary VPN connection 138, the keys used for the secondary VPN connection 138 are changed more frequently than those used for the primary VPN connection 136. The primary VPN connection 136 is used as a secure channel to exchange key information used by the device 10 and VPN gateway 122 to establish and update the encryption and decryption keys used for the secondary VPN connection 138. In one configuration, upon setup of the media session, the primary VPN connection 136 is used to exchange a shared secret such as a seed. The seed is then used at the VoIP VPN modules 116, 128 to establish the key or keys used for data encryption/decryption for the secondary VPN connection 138. In some embodiments the seed is the encryption key.

As indicated in step 206, the keys used for the secondary VPN connection 138 are changed or updated throughout the media session. In order to update the keys, during the media session, updated seeds are periodically generated by the VoIP VPN Module 128 of the VPN gateway 122 and transmitted through the primary VPN connection 136 to the mobile device 10. Each updated seed is used at the VoIP VPN modules 116, 128 to establish new key or keys for data encryption/decryption for the secondary VPN connection 138 until a new updated seed is generated and transmitted. In one configuration, the VoIP VPN Module 128 is configured to generate an updated seed at regular periodic intervals throughout the media session. In some embodiments, the duration of the periodic intervals and/or the size of the seed are configurable values that can be set according to an enterprise's IT policy. In some embodiments, the party making a call is presented with the option, when making the call, of selecting a security level for a call. A higher security level for secondary VPN connection 138 would use shorter intervals between updated seeds and/or longer seeds than a lower security level.

In at least some example embodiments, the security level is automatically adapted by VoIP VPN module 128 based on characteristics of the media session. In one such configuration, the security level is determined based on the identification of either one or both of the mobile device 10 and the terminal device 126, with shorter seed change intervals and/or longer seeds and/or different algorithms being used for higher security levels than lower security levels. In one example, a security database 129 maintained at the enterprise network 120 for use by the VoIP VPN module 128 and/or SIP gateway 124 is used for categorizing media sessions into different security level classifications. In this regard, in one configuration the security database 129 categorizes calls based on device addresses (which can include phone numbers in at least one embodiment) such that at least some known device addresses are associated in the security database with predetermined security levels. When a media session is established, the VoIP VPN module 128 references the security database to determine if either the initiating or destination device has an address (for example a telephone number) associated with a security level in the security database and if so uses the appropriate security level during the media session. Uncategorised device addresses are assigned a default security level.

In some example embodiments, a contacts database 118 is maintained at the mobile device 10, and in addition to or in place of the categorized addresses in the security database 129 at the enterprise network 120, at least some of the addresses in the contacts database 118 are categorized with security levels. When a telephone call is made to one of the categorized addresses, the associated security level is referenced by the device VoIP VPN module 116 and applied to the secondary VPN connection 138 that is set up for the media session used for the call. In one configuration of such embodiment, the user of device 10 can configure the security level used for calls to phone numbers in the contacts database 118.

In some example embodiments, adaptive call profiles are maintained in the enterprise security database 129 and/or the contacts database 118 of individual mobile devices 10 for selected device addresses. For example, average and/or median call durations between device addresses that repeatedly call each other are tracked such that when a media session is established a security level for the secondary VPN connection 138 is selected based on the anticipated call duration. When the call profiles for a pair of device addresses indicates that calls or media sessions between the devices typically last a long time a higher security level (resulting in either a longer seed and/or more seed updates) is applied than if the call profile indicates a shorter typical call duration. Thus, calls between parties that typically call each other for long periods, for example 15 minutes, will have a higher security level applied in the secondary VPN connection 138 than calls between parties that typically last shorter periods, for example 5 minutes.

As indicated in step 208, the secondary VPN connection 138 is terminated when the media session that the connection was set up for is terminated. Thus, in example embodiments the secondary VPN connection 138 is set up with the media session it is intended to protect and then terminated at the end of such media session.

Although in respect of the embodiments described the key information for secondary VPN connection 138 is generated at the VPN gateway 122 and set to mobile electronic device 10, in some embodiments the key information can be generated at mobile electronic device 10 and then sent over the primary VPN connection 136 to the VPN gateway 122.

Figure 3:
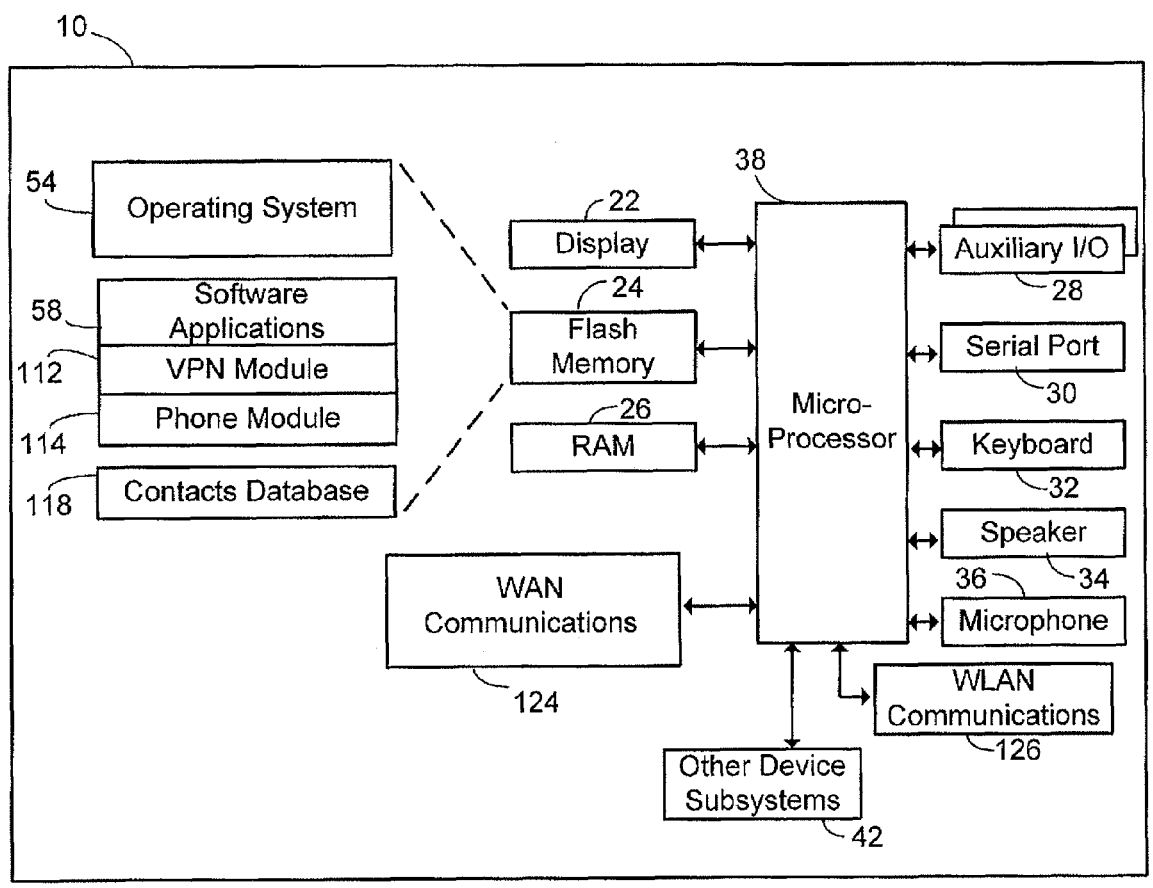
FIG. 3 is a block diagram showing an example of a mobile electronic device that can be used in the communications systems of FIG. 1.

An example of a mobile electronic device 10 with which at least some embodiments of the present disclosure may be used is shown in FIG. 3. The device 10 includes wireless WAN communication subsystem 124 for two-way communications with a wireless WAN and a WLAN communication subsystem 126 for two way communications with a WLAN. Communications subsystems 124 and 126 include RF transceivers and may also include signal processors such as DSPs for example. The device 10 includes a microprocessor 38 that controls the overall operation of the device. The microprocessor 38 interacts with communications subsystems 124 and 126 and also interacts with further device subsystems such as the display 22, flash memory 24, random access memory (RAM) 26, auxiliary input/output (I/O) subsystems 28 (which may include a thumb-wheel, for example), serial port 30 (which may include a USB port, for example), keyboard or keypad 32, speaker 34, microphone 36, and any other device subsystems generally designated as 42.

Operating system software 54 and various software applications 58 used by the microprocessor 38 are, in one example embodiment, stored in a persistent store such as flash memory 24 or similar storage element. Software applications 58 may include a wide range of applications, including an address book application (which references contacts database 118), a messaging application, a calendar application, and/or a notepad application. Included among applications 58 is the software for implementing telephone module 114 for enabling the mobile device 10 to function as a mobile phone. Also included among applications 58 is the software for implementing the VPN module 112. Each software application 58 may include layout information defining the placement of particular fields in the user interface for the software application 58, such as text fields, input fields, etc. Those skilled in the art will appreciate that the operating system 54, specific device applications 58, or parts thereof, may be temporarily loaded into a volatile store such as RAM 26. Received communication signals may also be stored to RAM 26.

The microprocessor 38, in addition to its operating system functions, enables execution of software applications 58 on the device. A predetermined set of applications 58 which control basic device operations, including at least data and voice communication applications for example, will normally be installed on the device 10 during manufacture. Further applications may also be loaded onto the device 10 through the network 110, an auxiliary I/O subsystem 28, serial port 30, communications subsystem 124, 126 or any other suitable subsystem 42, and installed by a user in the RAM 26 or a non-volatile store for execution by the microprocessor 38.

The above-described embodiments of the present disclosure are intended to be examples only. Alterations, modifications and variations may be effected to the particular embodiments by those skilled in the art without departing from the scope of the application, which is defined by the claims appended hereto.

The invention claimed is:

1. A method for protecting real-time data exchanged as packets between a mobile electronic device and a VPN gateway during a media session over a communications link that includes a wireless network, the method comprising:
   establishing a first VPN connection between the mobile electronic device and the VPN gateway through the communications link, the first VPN connection using a first key-based encryption algorithm to protect data exchanged therethrough;
   establishing, while the first VPN connection is established, a second VPN connection between the mobile electronic device and the VPN gateway through the communications link, the second VPN connection using a second key-based encryption algorithm to protect data exchanged therethrough, wherein the second algorithm comprises a lower-bit encryption algorithm than the first algorithm;
   providing key information for the second VPN connection to at least one of the mobile electronic device or VPN gateway through the first VPN connection, wherein the key information is for encrypting and decrypting the real-time data exchanged through the second VPN connection; and
   exchanging real-time data packets between the mobile electronic device and the VPN gateway through the second VPN connection.

2. The method of claim 1, wherein updated key information for the second VPN connection is provided through the first VPN connection at intervals while the second VPN connection is established.

3. The method of claim 2, wherein the updated key information is exchanged at regular intervals while the second VPN connection is established.

4. The method of claim 2, wherein at least one of:
   (i) the intervals at which the updated key information is provided, or
   (ii) a strength of the encryption used for the second VPN connection, is based on an identification of at least one of the mobile electronic device or a terminal device with which the mobile electronic device is exchanging the real-time data.

5. The method of claim 2, wherein a terminal device exchanges the real-time data with the mobile electronic device during a media session through the VPN gateway and the second VPN connection, the method including tracking information for media sessions between the mobile electronic device and the terminal device, wherein at least one of:
   (i) the intervals at which the updated key information is provided, or
   (ii) a strength of the encryption used for the second VPN connection, is based on the tracked information.

6. The method of claim 5, wherein the tracked information includes information about durations of previous media sessions between the mobile electronic device and the terminal device.

7. The method of claim 1, wherein the real-time data comprises VoIP voice data, the method including setting up a VoIP media session between the mobile electronic device and a terminal device through the communications link and VPN gateway, wherein the VoIP voice data is exchanged between the VPN gateway and the mobile device using the second VPN connection, and wherein the second VPN connection is established for the VoIP media session and then terminated upon completion of the VoIP media session.

8. A mobile electronic device for engaging in a media session in which real-time data packets are exchanged with a remote location, the mobile device comprising:
   a wireless communications subsystem for exchanging data packets with the remote location through a communications link that includes a wireless network;
   a processor for controlling the communications subsystem; and
   a VPN module associated with the processor for establishing co-existing first and second VPN connections through the communications link between the mobile electronic device and the remote location and exchanging there-between real-time data through the second VPN connection protected by a less resource-intensive encryption algorithm than the data sent through the first VPN connection;
   wherein the VPN module is configured for receiving key information through the first VPN connection and using the received key information for encrypting and decrypting the real-time data exchanged through the second VPN connection.

9. The mobile electronic device of claim 8, wherein the VPN module is configured for generating encryption key information for the second VPN connection and for sending the generated encryption key information through the first VPN connection to the remote location.

10. The mobile electronic device of claim 9, wherein the VPN module is configured for generating and sending updated encryption key information for the second VPN connection at intervals while the second VPN connection is established.

11. A VPN gateway for exchanging real-time data packets with a remote device over a communications link, the gateway having means for establishing co-existing first and second VPN connections through the communications link between the VPN gateway and the remote device location and exchanging there-between real-time data through the second VPN connection protected by a less resource-intensive encryption algorithm than the data sent through the first VPN connection;
    wherein the gateway is configured for generating encryption key information for the second VPN connection and for sending the generated encryption key information through the first VPN connection to the remote location, wherein the key information is for encrypting and decrypting the real-time data exchanged through the second VPN connection.

12. The VPN gateway of claim 11, wherein the gateway is configured for generating and sending updated encryption key information for the second VPN connection at intervals while the second VPN connection is established.

13. The VPN gateway of claim 12, wherein the gateway is configured to determine the intervals for generating and sending the updated encryption key information based on an identification of at least the remote device or a further device that the real-time data packets are being exchanged with.

14. The VPN gateway of claim 12, wherein the gateway is configured to determine an encryption strength for the updated encryption key information based on an identification of at least the remote device or a further device that the real-time data packets are being exchanged with.

* * * * *